(12) United States Patent
Rose

(10) Patent No.: US 8,504,941 B2
(45) Date of Patent: Aug. 6, 2013

(54) DIGITAL IMAGE MAGNIFICATION USER INTERFACE

(75) Inventor: Daniel S. Rose, Salado, TX (US)

(73) Assignee: UTC Fire & Security Corporation, Farmington, CT (US)

( * ) Notice: Subject to any disclaimer, the term of this patent is extended or adjusted under 35 U.S.C. 154(b) by 0 days.

(21) Appl. No.: 13/285,401

(22) Filed: Oct. 31, 2011

(65) Prior Publication Data
US 2013/0111399 A1    May 2, 2013

(51) Int. Cl.
*G06F 3/048* (2013.01)

(52) U.S. Cl.
USPC ................ 715/801; 715/800; 345/661

(58) Field of Classification Search
None
See application file for complete search history.

(56) References Cited

U.S. PATENT DOCUMENTS

| | | | |
|---|---|---|---|
| 5,550,960 A * | 8/1996 | Shirman et al. | 345/582 |
| 7,965,865 B2 | 6/2011 | Hampapur et al. | |
| 2002/0054211 A1 | 5/2002 | Edelson et al. | |
| 2002/0152557 A1 | 10/2002 | Elberbaum | |
| 2006/0267803 A1 | 11/2006 | Mathis et al. | |
| 2007/0130525 A1 * | 6/2007 | Murphy et al. | 715/747 |
| 2007/0257934 A1 | 11/2007 | Doermann et al. | |
| 2008/0118237 A1 | 5/2008 | Wegenkittl et al. | |
| 2008/0238947 A1 * | 10/2008 | Keahey et al. | 345/666 |
| 2009/0295830 A1 * | 12/2009 | Muraveynyk et al. | 345/629 |

FOREIGN PATENT DOCUMENTS

| | | |
|---|---|---|
| EP | 0260144 A2 | 3/1988 |
| WO | 2008003989 A1 | 1/2008 |

OTHER PUBLICATIONS

International Search Report and Written Opinion, International Application No. PCT/US2012/059795 filed Oct. 11, 2012, dated Feb. 7, 2013, pp. 1-9, published by the WIPO.

* cited by examiner

*Primary Examiner* — Stephen Hong
*Assistant Examiner* — Asher Kells
(74) *Attorney, Agent, or Firm* — MH2 Technology Law Group, LLP

(57) ABSTRACT

A graphical user interface for displaying and magnifying a source image about a focus point comprises an image frame with a background image and a zoomed-in image. The image frame is responsive to user input. The background image is created from the source image, and fills the image frame. The zoomed-in image is created by mapping at least a portion of the source image onto a curved surface as a texture, and superimposing a two-dimensional render of the resulting textured surface atop a region of the background image.

19 Claims, 3 Drawing Sheets

DIGITAL IMAGE MAGNIFICATION USER INTERFACE

BACKGROUND

The present invention relates generally to video interfaces, and more particularly to a user interface for digital video magnification.

Surveillance systems commonly receive digital video from one or more cameras, and play back that video on screens or displays of one or more user stations, either in real time or from a recorder or archive. Such video is commonly displayed via a user interface which may allow users to control the pan, tilt, or zoom of the camera. For archived footage, user interfaces typically also allow users to advance or scan backwards or forwards through video at multiple speeds. Zooming allows a user to focus on a small region of an image or video sequence of images, by providing an expanded image of a reduced camera field of view. Many conventional methods exist for both optical and digital (software-based) zoom. By zooming in on one feature, however, users limit their ability to observe surrounding features outside of the resulting reduced field of view. To prevent this information from being lost, some user interfaces for surveillance systems provide a "Picture in a Picture" image, wherein small reference image of the full camera field of view overlays a larger, zoomed image. This smaller, un-zoomed image is sometimes marked to indicate the region visible in the larger, zoomed image. "Picture in a Picture" interfaces allow users to view details in a zoomed-in area, while retaining the ability to see the wider field of view of the camera on the same screen.

"Picture in a Picture" interfaces do not provide a perfect solution. Some portion of the zoomed image is covered by the un-zoomed reference image, obscuring a portion of the zoomed image. Un-zoomed reference images in "Picture in a Picture" interfaces are typically very small, and correspondingly lose detail. Additionally, identifying the location of a zoomed image relative to an un-zoomed reference image requires eye movement between the two images, which can be disorienting. Conventional "Picture in a Picture" interfaces scale zoomed images linearly.

SUMMARY

The present invention is directed toward a graphical user interface for displaying and magnifying a digital image about a focus point, toward an image processing system which runs the graphical user interface, and toward a method for producing the magnified digital image. The graphical user interface comprises an image frame with a background image and a magnified image. The image frame is responsive to user input. The background image is created from the source image, and fills the image frame. The magnified image is created by mapping at least a portion of the source image onto a curved surface as a texture, and superimposing a two-dimensional rendering of the resulting textured surface atop a region of the background image.

DETAILED DESCRIPTION

Figure 1:
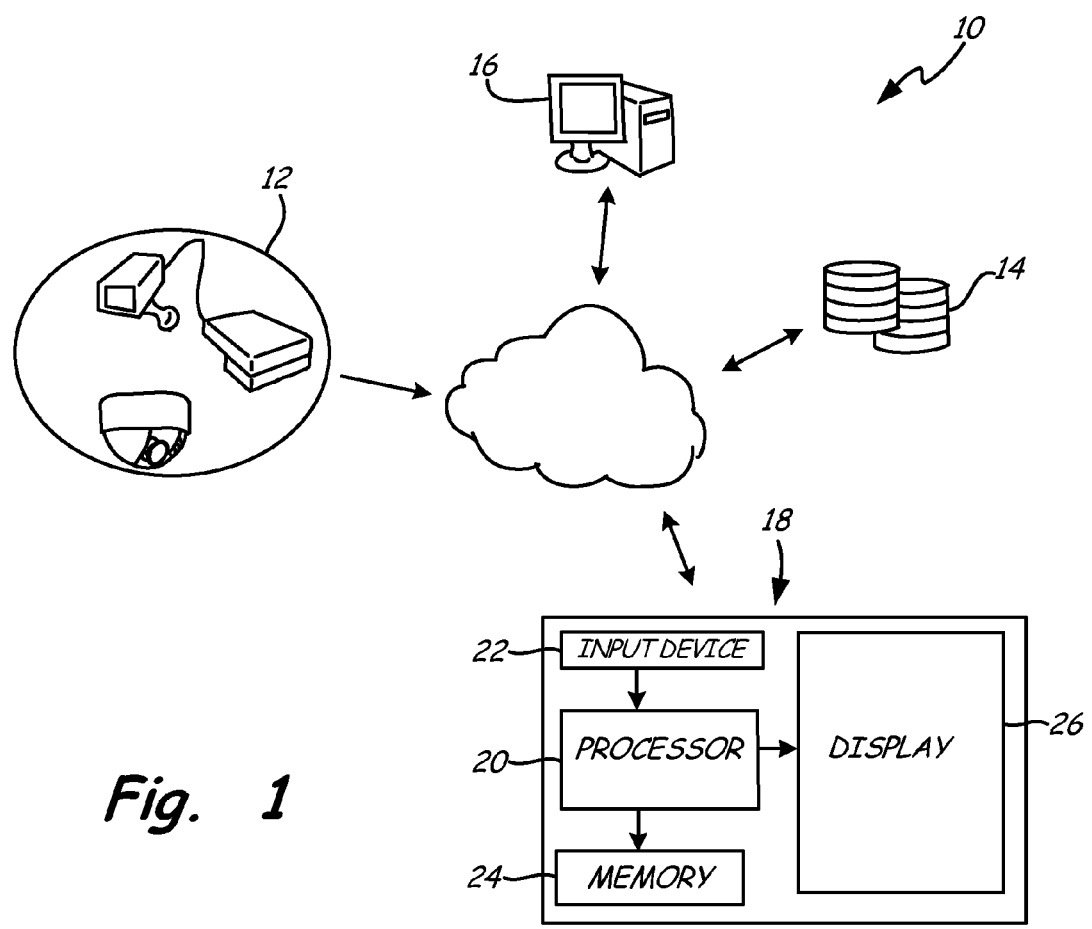
FIG. 1 is a block diagram of a video system of the present invention.

FIG. 1 is a block diagram of video system 10, comprising source 12, recorder 14, server 16, and user device 18. User device 18 has processor 20, input device 22, memory 24, and display 26. Source 12 is a video source such as a digital camera. Although only one source 12 is shown, many video sources may be included in video capture and playback network 10. Recorder 14 is a video recorder which encodes real time video from source 12, and stores encoded video in a machine-readable format. In some embodiments source 12 and recorder 14 may communicate directly, while in other embodiments recorder 14 may receive video from source 12 only through video capture and playback network 10. Although only one recorder 14 is shown, many video recorders may be included in video capture and replay network 10, potentially including multiple recorders which encode video from source 12, as well as multiple recorders which encode video from other sources. Server 16 is a video management server which may catalogue, retrieve, or process video from recorder 14 for playback at user device 18. Alternatively, server 16 may catalogue video from recorder 14 and provide configuration information enabling user device 18 to directly retrieve and play back video from recorder 14. User device 18 is a logic-capable user-side video viewing device such as a personal computer, through which a user may view and manipulate video from source 12, recorder 14, or server 16. In some embodiments local server 16, recorder 14, and client device 18, or some combination thereof, may be logically separable parts of a single hardware computer. Local server 16 and client device 18 are computers with processors and hardware memory, and may be either specialized hardware computers or general purpose computers running specialized software for video management and viewing.

In one embodiment, user device 18 receives real-time video directly from client 12, and may be able to control camera pan, tilt, or zoom of source 12. In other embodiments user device 18 receives archived video from recorder 14, either directly or via server 16. User device 18 includes processor 20, which may, for instance, be a conventional microprocessor. Processor 20 receives inputs from input device 22, which may be a keyboard, mouse, touch screen, or other conventional device for providing user input. User device 18 may use multiple input devices 22. Processor 20 reads from and writes in memory 24, and displays an image of selected video on display 26.

Processor 20 runs a user interface which is viewable on display 26, as described below with respect to FIG. 3. This user interface allows a user to view portions of source image SI provided by source 12, recorder 14, or server 16 under magnification, while preserving the remainder of the base image in an un-magnified state.

Figure 2:
FIG. 2 is a screenshot of an exemplary prior art "Picture in a Picture" user zoom interface.

FIG. 2 is a screenshot of image frame 100 of an exemplary prior art "Picture in a Picture" user zoom interface. Image frame 100 contains zoomed-in image 102 and reference image 104 with field of view indicator 106. Zoomed-in image 102 shows a magnified region of reference image 104 designated by view indicator 106. Although view indicator 106 is depicted as a dashed rectangle on reference image 104, other conventional view interfaces use shading or color to indicate the field of view of zoomed-in image 102 on reference image 104.

Zoomed-in image 102 is produced by linearly scaling a portion of source image SI. Reference image 104 is conventionally provided to allow a user to quickly identify the location displayed in zoomed-in image 102. As shown, reference image 104 is a small image superimposed atop the upper right corner of zoomed-in image 102. In other conventional cases reference image 104 may appear in other areas, but always obstructs at least a portion of zoomed-in image 102, thereby preventing some viewing space from being used to view zoomed-in image 102.

Figure 3:
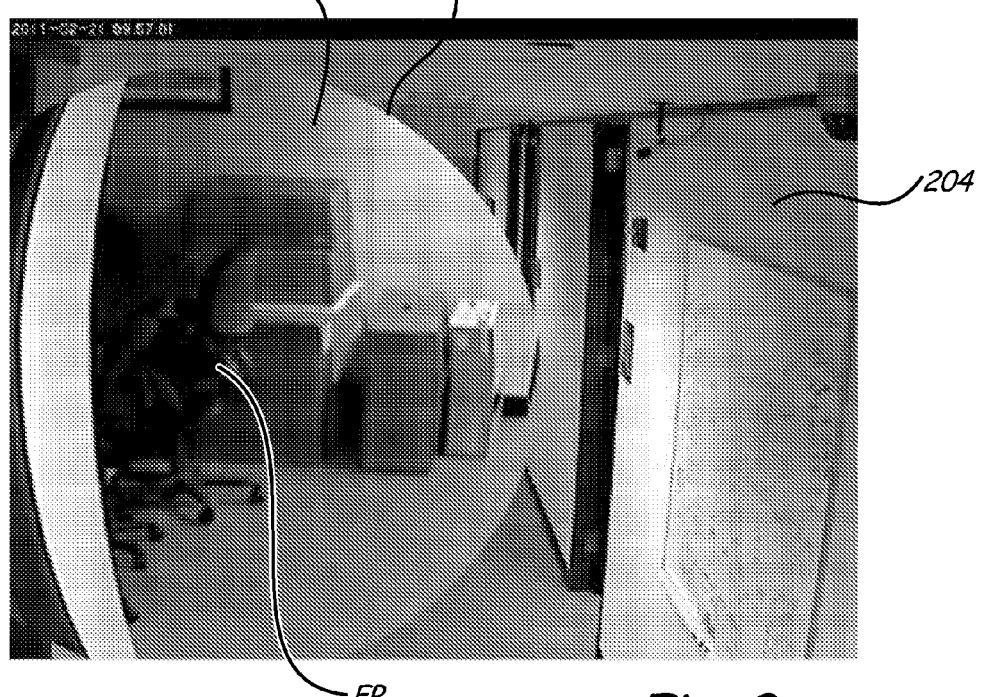
FIG. 3 is a screenshot of a user zoom interface of the present invention.

FIG. 3 is a screenshot of image frame 200 of the user zoom interface of the present invention. Image frame 200 contains zoomed-in image 202 and background image 204. Zoomed-in image 202 is superimposed atop background image 204, and is bounded by boundary 206. Background image 204 is an image at a wider field of view than zoomed-in image 202. Background image 204 need not, however, correspond to the maximum field of view available from source 12, or from recorded video provided by recorder 14 or server 16 (i.e. the full recorded field of view of source image SI). Zoomed-in image 202 is a region of viewing frame 200 which displays a sub-portion of background image 204, centered about focus point FP, at higher magnification. Image frame 200 is responsive to user input, such that focus point FP can be designated by a user via mouse clicks, key commands, or other conventional methods. As depicted, zoomed-in image 202 is created by mapping source image SI onto a sphere, and boundary 206 is therefore circular. More generally, zoomed-in image 202 is created by mapping source image SI onto curved surface CS, which may take a variety of shapes. For ease of understanding, this Description will assume a spherical curved surface CS where not otherwise specified, although a worker skilled in the art will understand that other surfaces can be substituted without departing from the system and method presented herein. Images processed according to the present invention may take many forms. In particular, source image SI may be an isolated, still image, or an image from a real-time or recorded video stream from source 12, recorder 14, or server 16.

Zoomed-in image 202 is formed by applying source image SI to curved surface CS as a texture. This texture is translated on curved surface CS to align focus point FP with center of a viewing area of curved surface CS, which is then flattened along this viewing axis and superimposed atop background image 204 to provide non-linear magnification relative to background image 204, with maximum, approximately even magnification close to focus point FP. Dimensions of curved surface CS are selected to achieve a desired magnification. Where curved surface CS is a sphere, increasing the radius of curved surface CS produces greater magnification, while decreasing the radius of curved surface CS reduces magnification.

Users interact with source image SI via image pane 200. Image pane 200 may not include any zoomed-in image 202 prior to user input designating focus point FP. As stated above, focus point FP may be designated by any conventional means, such as mouse clicks, mouse swipes or drags, or key commands. Once focus point FP has been designated, zoomed-in image 202 centered on focus point FP is superimposed over background image 204, at the location of focus point FP on background image 204. Zoomed-in image 202 may then be dismissed with an alternate mouse click or key command, leaving only background image 204 within image pane 200. In some embodiments, focus point FP may be moved with key commands, by dragging zoomed-in image 202 with a mouse, or by other user input. Zoomed-in image 202 is initially created using a curved surface CS with predetermined dimensions. These dimensions (e.g. sphere radius) can be modified by user input such as mouse dragging or mouse wheel scrolling, thereby altering the magnification of zoomed-in image 202. In some embodiments, dimensions of curved surface CS may be recorded in memory 24 (see FIG. 1) when zoomed-in image 202 is dismissed, and used as the predetermined dimensions of a next curved surface CS used to create subsequent zoomed-in images 202. Although only one zoomed-in image 202 is shown in FIG. 3, some embodiments of the present invention may allow multiple zoomed-in images 202 to be simultaneously superimposed atop background image 204.

Image pane 200 may constitute only a part of a larger user interface including a plurality of images originating from multiple sources 12, or taken from multiple times or time periods of video at recorder 14. This user interface may further include input means for selecting source images SI, such as drop-down menus, drag-and-drop lists, or other conventional tools.

Zoomed-in image 202 provides non-linear magnification highest near an area of interest indicated by focus point FP. Magnification diminishes continuously close to boundary 206. This non-linear magnification allows general details away from focus point FP to be discerned for contextual purposes, while allowing high precision details to be discerned near focus point FP.

Figure 4:
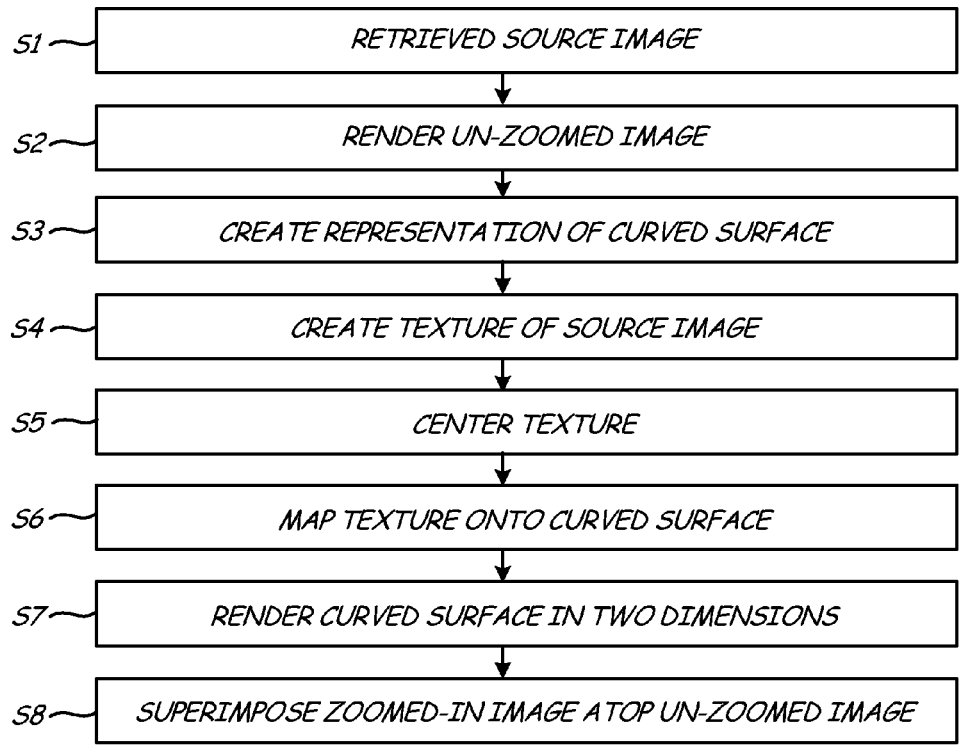
FIG. 4 is a method flowchart describing the algorithm by which the user interface of FIG. 3. is provided.

FIG. 4 is a flowchart of zoom method 300, by which zoomed-in images 202 are created from source image SI. First, user device 18 retrieves source image SI from source 12, recorder 14, or server 16. (Step S1). As discussed above, source image SI is an untransformed image either recorded at recorder 14, or streamed live from source 12. Source image SI may be an image from video footage, as described above, or may be an isolated still image. Source image SI may be retrieved directly or via network 10, and is stored at user device 18 in memory 24. Source image SI is rendered in image frame 200 as background image 204. (Step S2). Background image 204 may or may not be scaled linearly with respect to source image, and may or may not comprise the entirety of source image SI, in various embodiments.

Next, processor 20 creates a representation of curved surface CS in three dimensions, in response to user input designating a focus point FP. (Step S3). Where θ is angle in the x-y plane, and φ is angle in the x-z plane, a spherical curved surface CS may, for instance, be generated in Cartesian coordinates with:

$X = r^2 \sin(\theta)\cos(\phi);$ $Y = r \sin(\theta);$ and $Z = r^2 \cos(\theta)\cos(\phi)$ As described above, radius r is selected according to the desired level of magnification, with larger radii r producing greater magnification. In some embodiments, this representation of curved surface CS may be produced using functions from common libraries such as OpenGL or Direct3D.

Processor 20 next creates texture T from source image SI. (Step S4). Texture T may be stored in a texture buffer in OpenGL or Direct3D. In some embodiments, texture T may be identical in size to source image SI. In other embodiments, source image SI may be linearly scaled to create an enlarged texture T, linearly increasing the eventual magnification of zoomed-in image 202. Such scaling may be accomplished by a range of conventional methods, including using OpenGL or DirectX scaling functions. The resulting texture T is next translated to position focus point FP at the center of a viewing area of curved surface CS, such that focus point FP appears at the center of eventual zoomed-in image 202. (Step S5)

Processor 20 maps texture T to curved surface CS, "wrapping" texture T around the representation of curved surface CS such that pixels of texture T are mapped onto pixels or sets of pixels on curved surface CS. (Step S6). For a texture defined with width u and height v, mapping onto a spherical curved surface CS using:

$$u = y/x = \tan^{-1}(\theta)$$

$$v = z = \sin^{-1}(\phi)$$

In some embodiments, texture T may be mapped onto curved surface CS using appropriate OpenGL or Direct3D functions. This mapping results in a textured three dimensional object (such as a sphere). This three dimensional object is next rendered in two dimensions to produce zoomed-in image 202, a flattened image of textured curved surface CS. (Step S7). As with other mapping and rendering steps, the rendering of zoomed-in image 202 may be accomplished using appropriate graphics libraries such as OpenGL or Direct3D. Zoomed-in image 202 exhibits greatest and most uniform zoom near focus point FP, and correspondingly compresses source image SI in the vicinity of boundary 206. Finally, zoomed-in image 202 is superimposed atop background image 204, and translated to align aligning focus point FP on zoomed-in image 202 with focus point FP on background image 204. (Step S8). Zoomed-in image 202 thus provides a magnified view of a portion of background image 204, while utilizing the entire space of image frame 200 and allowing a user to easily and immediately recognize the location shown in zoomed-in image 202 as a portion of background image 204. By dragging or recreating zoomed-in image 202 at various locations on background image, a user is able to select a region of background image 204 for scrutiny under non-linear magnification.

Although this Description has focused on spherical curved surfaces CS, other curved surfaces may alternatively be used. In particular, curved surface CS need not be a closed surface. Curved surface CS may, for instance, be a non-uniform rational B-spline (NURB) surface formed by "pulling" a focal area of a surface towards the viewer. Any two-dimensional shape could be used to form such as NURB surface, including circles, rectangles, or arbitrary polygons. The process for producing zoomed-in image 202 remains substantially the same using any suitable curved surface CS: first retrieve source image SI, then render background image 204, then create a three-dimensional representation of curved surface CS and map a texture formed from a portion of source image SI onto that representation, then render curved surface CS into a two-dimensional zoomed-in image 202, superimposed atop background image 204. In some embodiments, only the portion of background image 204 covered by zoomed-in image 202 may be used to generate texture T, in such embodiments. Using a symmetrical NURB surface for curved surface CS provides greater continuity between zoomed-in image 202 and background image 204 over the spherical curved surface CS described above. Regions of zoomed-in image 202 closest to boundary 206 will be compressed, and regions closest to focus point FP will be expanded, but zoomed-in image 202 can align with background image 204 at boundary 206, resulting in a more fluid transition between zoomed-in image 202 and background image 204, for greater ease of viewing. Greater zoom levels will, however, produce sharper transitions at boundary 206.

Although the present invention focuses on the use of spherical and other non-linear zoom by mapping image textures onto curved surfaces, this non-linear zoom may be supplemented with linear zoom. As discussed above with respect to Step S4, above, source image SI may sometimes be linearly scaled to create an enlarged texture T, linearly increasing the eventual magnification of zoomed-in image 202. In addition, some embodiments of the present invention may apply a linear zoom to zoomed-in image 202 after Step S7. For instance, zoomed-image 202 may optionally be scaled linearly in response to mouse wheel scrolling, after the spherical or NURB zooming. This allows the user to adjust zoom in level on the fly without changing curved surface dimensions.

Figure 5:
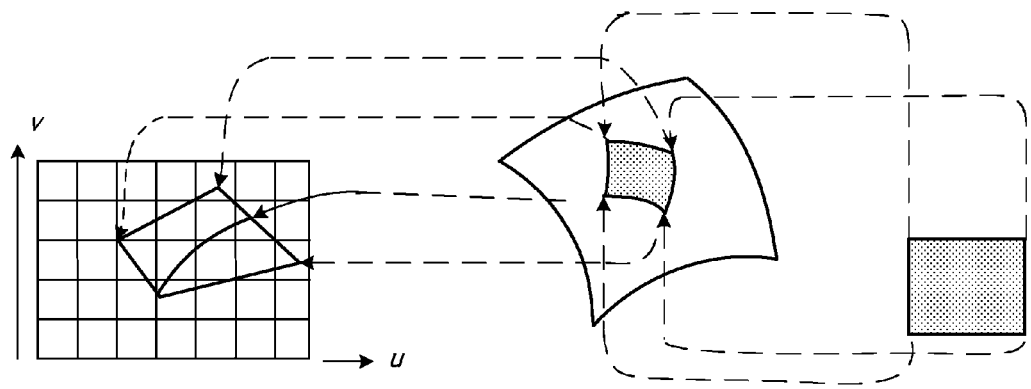
FIG. 5 is a concept illustration of a texture mapping process used to produce the user interface of FIG. 3.

FIG. 5 is a concept illustration of the texture mapping process described above with respect to steps S6 and S7 of method 300 (see FIG. 4). In particular, FIG. 5 illustrates the mapping of an image from texture space TS to object space OS to screen space SS. Texture space TS and screen space SS are two-dimensional spaces, while object space OS is a three-dimensional space. Curved surface CS exists in object space OS, and texture T exists in texture space TS. Mapping texture T onto curved surface CS (Step S6) requires that texture space TS be transformed into object space OS, as described above with respect to Step S6. Curved surface CS and zoomed-in image 202 similarly occupy object space OS and screen space SS, respectively. To render curved surface CS in two dimensions (Step S7), object space OS must be transformed into screen space SS. All of these transformations may be accomplished using library functions, as described above.

The present invention utilizes the entirety of image frame 200 to display zoomed-in image 202 and background image 204. Zoomed-in image 202 provides a non-linearly magnified view of a portion of background image 204, the size and magnification of which can be adjusted as to yield a desired field of view and level of magnification. Because the magnification of zoomed-in image 202 is non-linear, the resulting magnification is highest near an area of interest indicated by focus point FP, and diminishes continuously close to boundary 206. This gradual fall-off of magnification toward boundary 206 allows general details to be discerned for contextual purposes, away from focus point FP, while allowing high precision details to be discerned near focus point FP. Because zoomed-in image 202 is superimposed atop background image 204 and aligned with focus point FP, users can easily and immediately recognize the region of background image 204 depicted in zoomed-in image 202. By using a NURB surface as curved surface CS, the present invention is able to provide a more continuous, and therefore less disorienting, transition between zoomed-in image 202 and background image 204.

While the invention has been described with reference to an exemplary embodiment(s), it will be understood by those skilled in the art that various changes may be made and equivalents may be substituted for elements thereof without departing from the scope of the invention. In particular, although the present invention has been discussed with respect to video zoom, a person skilled in the art will recognize that the disclosed user interface could also be used to magnify still or non-sequential images. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An image processing system for displaying and magnifying a source image about a focus point, the image processing system comprising:
   an input device configured to receive an input designating the focus point from a user;
   an output screen; and
   a processor programmed to render a graphical user interface on the output screen, the graphical user interface comprising:
   an image frame displayed on the output screen, the image frame responsive to user input via the input device;
   a background image generated from the source image and rendered on the output screen to fill the image frame; and
   a zoomed-in image created by mapping at least a portion of the source image onto a curved surface as a texture, and superimposing a two-dimensional render of a resulting textured surface atop a region of the background image in the image frame, on the output screen, wherein a magnification of the zoomed-in image changes in response to a change in radius to the curved surface.

2. The image processing system of claim 1, wherein the zoomed-in image is centered about the focus point, and is superimposed atop the background image at a location of the focus point.

3. The image processing system of claim 1, wherein the input device comprises a mouse, and the processor controls the image frame in response to mouse clicks or similar user inputs which define the focus point.

4. The image processing system of claim 3, wherein the input device is further configured to reset or remove the zoomed-in image from the output screen in response to inputs from the user.

5. The image processing system of claim 3, wherein the focus point can be moved by dragging the zoomed-in image with a mouse, with key commands, or by similar user inputs made via the input device.

6. The image processing system of claim 1, wherein the input device further comprises an input mechanism capable of selecting the source image.

7. An image processing system comprising:
   an image source which produces a source image; and
   a user device comprising:
   a screen which displays an image frame wherein a zoomed-in version of the source image is superimposed atop a region of a background version of the source image; and
   a processor which produces the zoomed-in version of the source image by mapping at least a portion of the source image onto a curved surface as a texture, and rendering a resulting surface in two dimensions, wherein a magnification of the zoomed-in version of the source image changes in response to a change in radius to the curved surface.

8. The image processing system of claim 7, further comprising a recorder which stores the source image.

9. The image processing system of claim 8, further comprising a server which transfers or mediates transfer of images between at least some of the image source, the recorder, and the user device.

10. The image processing system of claim 7, wherein the curved surface is a sphere.

11. The image processing system of claim 7, wherein the curved surface is a NURB surface.

12. The image processing system of claim 7, further comprising one or more additional image sources, and wherein the user device includes an input mechanism for selecting the source image from the image source or the one or more additional image sources.

13. The image processing system of claim 7, wherein the user device further comprises at least one input device such as a keyboard, mouse, or touch screen whereby users can designate a dimension of the curved surface and a location of the zoomed-in image.

14. A digital zoom method comprising:
   retrieving a digital source image from an image source or an image recorder;
   rendering a background image from the digital source image on a screen;
   creating a representation of a curved surface;
   creating a texture from the digital source image;
   mapping the texture onto the curved surface;
   rendering the curved surface in two dimensions to produce a zoomed-in image, wherein a magnification of the zoomed-in image changes in response to a change in radius to the curved surface; and
   superimposing the zoomed-in image atop a portion of the background image, on the screen.

15. The digital zoom method of claim 14, wherein the curved surface is a sphere.

16. The digital zoom method of claim 14, wherein the curved surface is a NURB surface.

17. The digital zoom method of claim 14, wherein creating a texture of the digital source image comprises linearly scaling the digital source image.

18. The digital zoom method of claim 14, further comprising centering the texture about a focus point, and wherein the zoomed-in image is superimposed atop a portion of the background image corresponding to the focus point.

19. The digital zoom method of claim 14, further comprising linearly scaling the zoomed-in image.

* * * * *